INVENTORS
JOHN M. CHAMBERS
LEONARD R. PAYNE

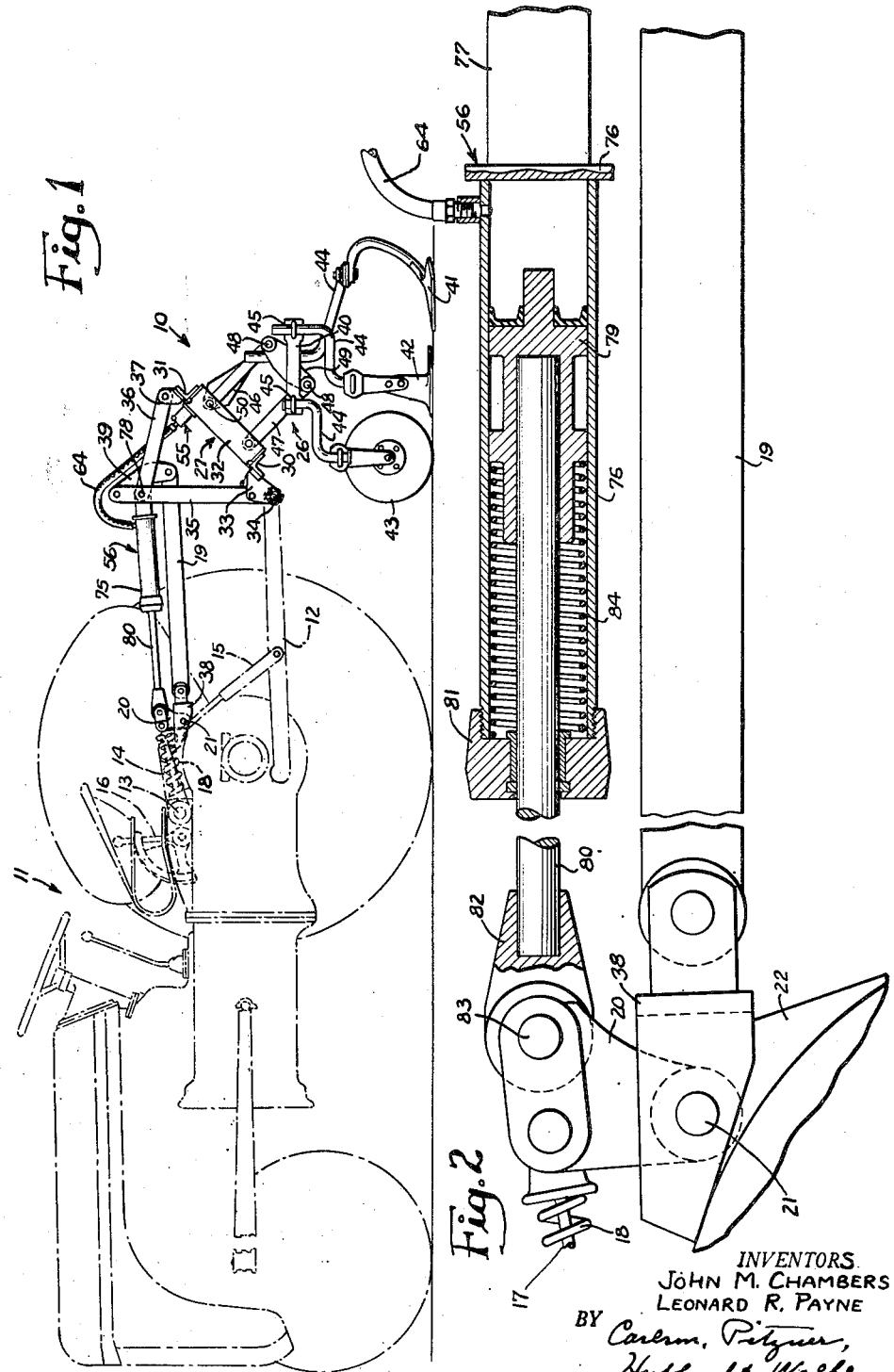

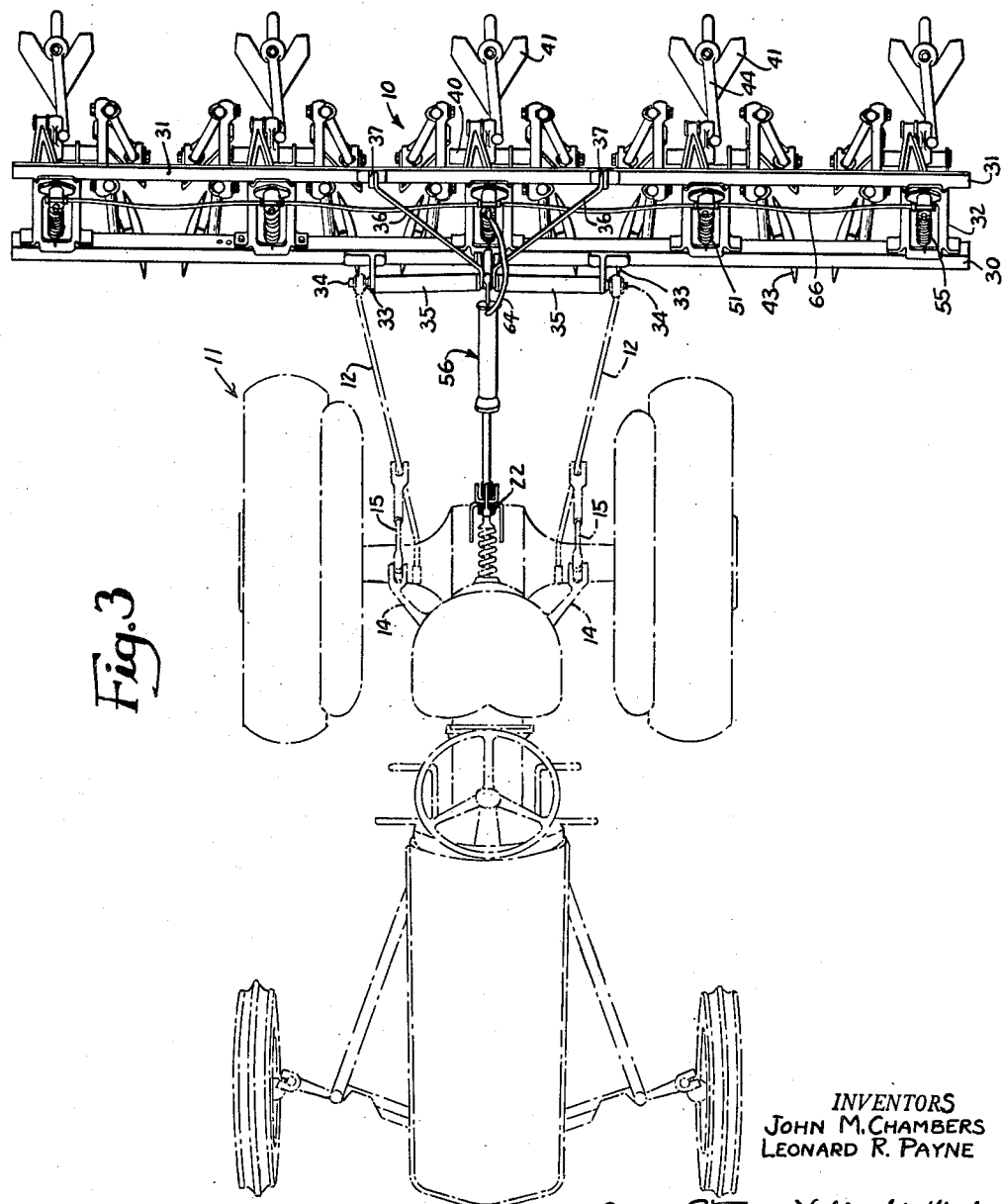

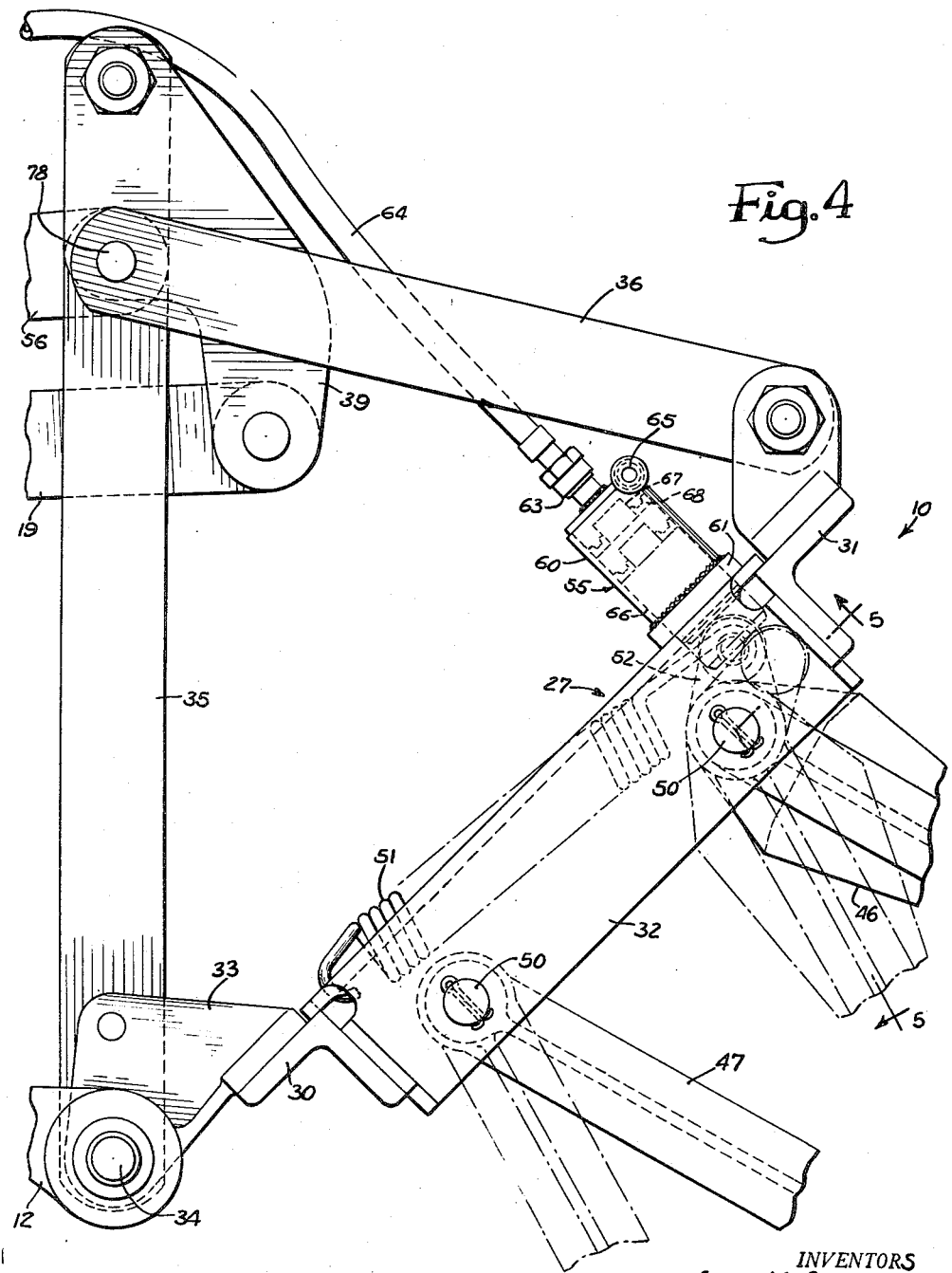

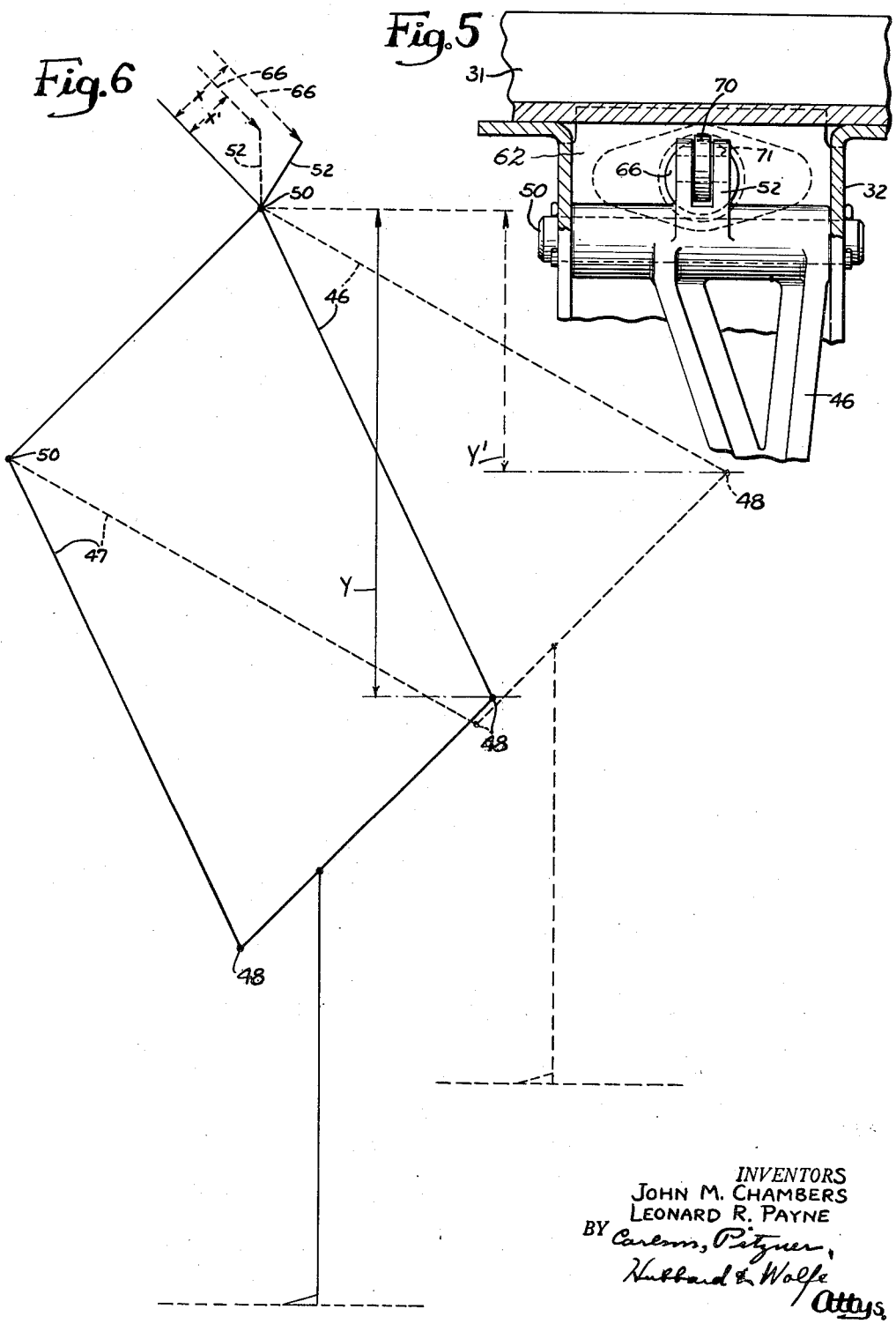

United States Patent Office 2,782,703
Patented Feb. 26, 1957

2,782,703

DEPTH CONTROL MECHANISM FOR TRACTOR-MOUNTED IMPLEMENTS

John M. Chambers, Leamington Spa, and Leonard R. Payne, Yardley, Birmingham, England, assignors to Massey-Harris-Ferguson (Sales) Limited, a British company Application April 12, 1952, Serial No. 282,022

Claims priority, application Great Britain April 14, 1951

17 Claims. (Cl. 97—46.07)

The invention relates to ground working implements adapted for use with tractors having automatic draft or depth control, and it is more particularly concerned with improved mechanism for transmitting forces proportioned to the ground resistance or soil pressure encountered by an implement to the depth controlling instrumentalities on the tractor.

The invention is particularly well adapted for use with tractors equipped with the system of automatic depth control disclosed in the Ferguson Patent No. 2,118,180, issued May 24, 1938. In such tractors the implement is attached by means of a hitch linkage including a pair of lower laterally spaced draft links and an upper or compression link, all trailingly pivoted on the rear end of the tractor. As the implement is drawn forwardly in operating position by the draft force applied through the lower links, the soil pressure or resistance on the ground engaging part or parts of the implement tends to rock the implement forwardly and exerts a compressive force on the upper link proportioned to the soil pressure. This compressive force is utilized to actuate the spring-biased member of a control system for a hydraulically operated power unit on the tractor adapted to raise or lower the hitch links, the control system being operative to respond to variations from a predetermined value of the compression load on the upper link. The response of the power unit results in a corrective raising or lowering of the draft links and attached implement to reestablish the predetermined compression load and thereby maintain the ground engaging part of the implement at a substantially uniform depth.

The range of compressive load variations produced by different types of implements varies so widely that a control system constructed and arranged to produce a prompt and accurate response of the tractor power unit for one type of implement will not operate as efficiently and accurately with implements such as cultivators, seeders, etc. Thus, if the control system is designed to function efficiently with a plow or comparable implement where a change in working depth of an inch or so may produce a load variation of several hundred pounds, it cannot be expected to operate with the same efficiency and accuracy with the implements such as cultivators which produce a much smaller load variation for much greater changes in working depth. Conversely, controls arranged to respond properly to the compression load variations produced by light draft implements are not generally suitable for use with heavy draft implements.

With the above in view, one object of the invention is to provide an improved control force transmitting mechanism which can be incorporated in substantially any type of tractor mounted ground working implement and which effectively adapts the ground resistance characteristics of the associated implement for actuating the tractor depth control mechanism in a manner such that the working depth of the implement is maintained substantially uniform.

Stated in another way, it is an object of the invention to provide improved control force transmitting mechanism for incorporation in tractor mounted ground working implements which is adapted to effectively translate the ground resistance encountered by the implement into a compressive load on the tractor controls within the range to which the controls are designed to respond most efficiently.

A more specific object is to provide a control force transmitting mechanism for tractor mounted implements embodying means for changing the ratio between the transmitted control force and the soil pressure encountered by the implement to enable the depth control mechanism of the tractor to respond with the promptness and accuracy required to maintain the implement at a uniform working depth.

Still another object is to provide an implement in which the ground engaging tool or tools are movable relative to the implement frame in proportion to the soil pressure encountered by the tool or tools and in which such relative movement is utilized to actuate the depth control mechanism of the tractor to effect bodily raising or lowering of the implement frame to maintain the tool or tools at a predetermined uniform working depth.

Another object is to provide control force transmitting mechanism for implements equipped with a plurality of laterally spaced ground working tools each of which is independently movable relative to the implement frame, which mechanism is adapted to transmit to the tractor controls a force proportioned to the total soil pressure encountered by all of the tools while substantially equalizing the soil pressure between the respective tools.

A further object is to provide mechanism for implements having a plurality of laterally spaced independently movable ground working tools, which mechanism is operative to maintain each of the tools at substantially the same working depth irrespective of changes in the surface contour of the ground transversely of the implement.

Other objects and advantages of the invention will become apparent from the following detailed description of the preferred embodiment illustrated in the accompanying drawings in which:

Fig. 1 is a side view of a tractor and attached implement embodying the features of the invention;

Fig. 2 is a longitudinal sectional view through the fluid operated actuator forming a part of the control force transmitting mechanism of the invention;

Fig. 3 is a plan view of the tractor and implement shown in Fig. 1;

Fig. 4 is an enlarged fragmentary side view of the implement and associated parts of the control force transmitting mechanism;

Fig. 5 is a fragmentary view of the implement and control force transmitting mechanism as viewed from the rear of the implement;

Fig. 6 is a diagrammatic view showing the manner in which the leverage ratio of the mechanism is automatically coordinated with the position of a tool assembly relative to the implement frame;

Figure 7:
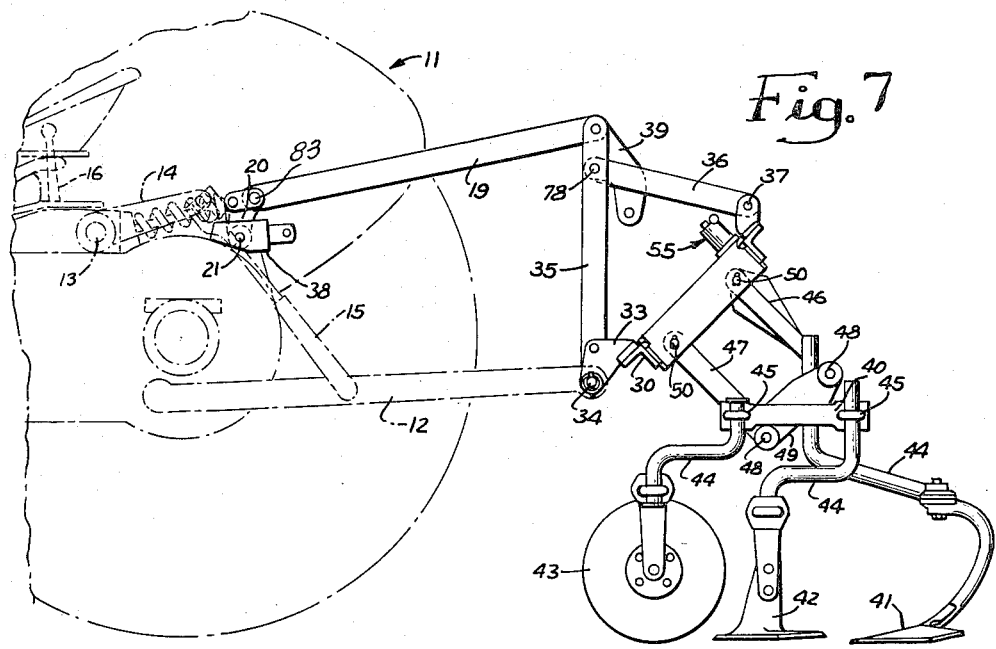
Fig. 7 is a side view of the tractor and implement equipped with a modified form of the mechanism.

While the invention is susceptible to various modifications and alternative constructions, two preferred embodiments have been illustrated in the accompanying drawings and will be described herein in detail. It is to be understood, however, that there is no intention to limit the invention to the particular forms illustrated or to use with implements and tractors of the specific types shown. On the contrary, it is the intention to cover all modifications, alternative constructions and applications falling within the spirit and scope of the appended claims.

By way of illustration, the invention has been shown as incorporated in an agricultural implement 10 attached to a light weight agricultural tractor 11 of well-known type. The exemplary tractor has a hitch linkage including a pair of laterally spaced draft links 12 trailingly pivoted on the tractor body below and slightly forwardly of the tractor rear axle. The hitch links and the implement attached thereto are adapted to be raised and lowered by a power unit on the tractor acting through a rock shaft 13 journaled on the tractor body and having rigid crank arms 14 at opposite ends connected with the respective draft links by drop links 15.

The particular tractor illustrated employs a hydraulic power unit for raising the draft links. The controls for this power unit may be of the same basic type as those disclosed in the Ferguson patent above mentioned. Briefly, the controls are arranged to automatically condition the power unit for raising or lowering the draft links to maintain the implement at a predetermined constant working depth determined by the setting of a manually operable quadrant lever 16. Such automatic depth control is effected through the medium of a control or plunger 17 (Fig. 2) adapted to be displaced against the force exerted by a main control spring 18 in proportion to the force generated through soil pressure on the ground engaging parts of the implement. More particularly, as the implement is drawn forwardly in operating position, the soil pressure on the ground engaging parts tends to rock it bodily in a forward direction about the pivotal connections with the draft links. Heretofore this bodily rocking of the implement has been utilized to apply a compression load to the plunger 17 and its associated control spring through the medium of a rigid link 19 connected at one end to an elevated portion of the implement, and, at the other end, to the plunger 17 through the medium of a rocker member or shackle 20. The shackle is pivotally secured by a pin 21 between a pair of upstanding lugs 22 on the tractor body.

In carrying out the invention, the ground engaging part of the implement or ground working tool is incorporated in an assembly 26 mounted for movement relative to the implement frame 27 under the urging of soil pressure while the implement frame itself is restrained against forward rocking movement relative to the hitch links by transferring the front connection of the top link 19 to a fixed part of the tractor. Such movements of the tool assembly relative to the implement frame are utilized in a novel manner to apply the control force to the control plunger 17 for effecting bodily raising or lowering of the implement for controlling working depth.

In cases where the implement is equipped with a plurality of ground working tools, the tools are each incorporated in an assembly and mounted on the implement frame for independent movement relative to the frame. In such organizations the control force transmitting mechanism is effective to combine the forces acting on the several tools and to transmit the same or a proportional force to the control plunger 17 on the tractor. Moreover, the force transmitting mechanism in that organization serves to automatically equalize the forces acting on the several tool assemblies so as to maintain each tool at the same working depth even though the ground level may vary substantially as between different tool assemblies.

The tool pressure equalizing feature of the invention may also be used to advantage with conventional arrangements for transmitting control forces to the control plunger on the tractor. More particularly, a portion of this mechanism associated with the tool assemblies may be incorporated in the implement to equalize the forces acting on the individual assemblies while the implement itself is attached to the tractor by a conventional hitch linkage and adapted to transmit control forces by bodily rocking of the implement frame in the conventional manner.

Referring to Figs. 1 and 3 of the drawings, the implement 10 selected to illustrate the invention is a light draft implement of the cultivator type commonly known as a steerable hoe, the steering mechanism being omitted in the present instance to simplify the disclosure. The frame 27 of the implement comprises a pair of transverse members 30 and 31 in the form of angle bars arranged in parallel relation and connected together at spaced intervals by rectangular sub-frames 32, each of which serves as a support for one of the tool assemblies 26.

For attachment to the tractor the frame bar 30 carries a pair of laterally spaced forwardly projecting brackets 33 each having an outwardly directed pin 34 adapted for engagement in the socketed connecting element at the trailing end of one of the draft links. Secured to the respective brackets 33 are a pair of upwardly converging struts 35 which have their upper ends bent to lie parallel in closely spaced relation for connection with the top link 19 of the tractor hitch linkage and other elements to be described hereinafter. The struts 35 are held in rigid relation to the frame 27 by brace bars 36 connected between the upper ends of the struts and brackets 37 on the upper angle bar 31 of the frame. The arrangement is such that when the implement is coupled to the tractor the struts 35 are disposed in a generally upright position and the frame 27 is inclined forwardly as shown in Fig. 1.

As indicated heretofore, the improved control force transmitting mechanism operates in response to movements of the tool assemblies relative to the frame 27 instead of from the forward tilting of the implement frame on the hitch links as in conventional implement-tractor hook-ups. The implement frame is restrained against forward tilting in the present instance by transferring the connection of the top link 19 from the shackle 20 to a fixed part of the tractor, in this instance by pivotally connecting it to a coupling element 38 in the form of a clevis arranged to straddle the shackle 20 and to be connected with the tractor by means of the pin 21 which secures the shackle in place. At its other or rear end the top link 19 is connected to a bracket 39 secured to and depending from the upper ends of the struts 35. The point of connection between the link and the bracket in this instance is positioned so that the link 19 extends substantially parallel to the draft links 12, thus eliminating any substantial tilting of the implement frame as it is raised and lowered by the draft links.

The implement 10 may be equipped with any reasonable number of the tool assemblies 26 or other comparable ground working tools. As these tool assemblies are alike, a description of one will suffice. In the particular embodiment illustrated, each tool assembly 26 comprises a carrier beam 40 to which any of a large variety of ground working tools may be detachably and adjustably secured. As shown in Fig. 1, the carrier beam 40 supports a pair of shovels 41 and 42 and a disc 43 each carried on a cranked stem 44 rigidly clamped to the beam by U-bolts 45.

The carrier beam 40 is mounted on the implement frame 27 in a manner to permit up and down parallel movement relative to the implement. To this end the beam is attached to the frame 27 by means of two downwardly trailing links 46 and 47 connected by pivot pins 48 at their lower ends to opposite ends of a diagonally disposed bracket 49 rigid with the beam. At their upper ends, the links 46 and 47 are connected by pivot pins 50 to side flanges of the sub-frame 32 which, as explained heretofore, is connected between the transverse members 30 and 31 of the implement frame. The pivot pins 48 and 50 are disposed at the corners of a parallelogram, thus constraining the carrier beam or implement assembly to parallel up and down motion relative to the implement frame 27.

To make the assembly more sensitive in its response to soil pressure, its weight is counterbalanced by a spring 51. As shown in Fig. 4, the spring 51 is a coiled tension spring operatively connected at one end to an arm 52 rigid with and projecting from the link 46 at the side opposite its pivotal support on the sub-frame 32. The other end of the spring 51 is anchored to the lower portion of the sub-frame 32.

As the implement is drawn forwardly by the tractor with the tools 41—43 in working engagement with the ground, the soil pressure on the tools tends to swing the assembly 26 rearwardly and upwardly. Such movement is resisted by the force transmitting mechanism or linkage provided by the present invention, which is interposed between the assembly and the control plunger 17 of the tractor in a manner such that movement of the assembly tends to impart a proportional movement to the plunger. In the preferred embodiment of the invention, the force-transmitting mechanism is hydraulically operated and comprises a primary piston and cylinder device 55 for each tool assembly and a secondary piston and cylinder device 56 connected between the implement frame and the control plunger 17 of the tractor. The primary and secondary piston and cylinder devices are connected in a closed hydraulic circuit filled, or substantially filled, with oil or other fluid so that the pressure exerted thereon by the piston of one of the devices is reflected by the application of a proportional pressure on the piston of the other device. Displacement of one piston, of course, results in a proportional displacement of the other piston.

In the case of implements equipped with a plurality of tool assemblies, each assembly is provided with its individual primary piston and cylinder device 55, and these devices are all connected together and to the secondary piston and cylinder device in a common closed hydraulic circuit. By reason of this interconnection, a force proportioned to the forces acting on the tool assemblies is available for actuating the secondary piston and cylinder device to adjust the control plunger 17. Moreover, the interconnection of the primary piston and cylinder devices serves to equalize the soil pressure on the assemblies; that is, the resistance opposed to the movement of each assembly is the same. Where the soil texture is relatively uniform the tools of each will penetrate the ground to the same depth, that is, the depth required to generate the required soil pressure regardless of any variations in the contour of the ground surface cross wise of the implement.

The cylinder and piston devices 55 and 56 may be of any preferred construction. As shown in Fig. 4, the primary piston and cylinder device 55 comprises a cylinder 60 open at one end and having a circumferential flange 61 at its open end adapted to be rigidly attached to a mounting plate 62 secured between the side members of the sub-frame 32. The closed end of the cylinder has a port equipped with a fitting 63 for attachment of a conduit 64 leading to the secondary piston and cylinder device 56. Also provided adjacent the closed end of the cylinder 60 is a port equipped with a T-shaped fitting 65 for connection of conduits 66 leading to the cylinders of other primary piston and cylinder devices. When only one of the primary devices is employed, the port communicating with the fitting 65 is closed by suitable plugs inserted in the fitting. Likewise, in the case of the primary devices at the ends of the implement, the outside end of the fitting is plugged.

Working in the cylinder 60 is a plunger or piston 66 which, in this instance, is arranged to project through an aperture in the mounting plate 62 for cooperation with the arm 52 of link 46. The piston is provided at its inner end with an extension 67 of reduced diameter adapted to engage the closed end of the cylinder to limit inward movement of the piston. A sealing ring 68 encircling the extension prevents leakage of fluid around the piston.

Referring more particularly to Fig. 5 of the drawings, it will be noted that the arm 52 of the link 46 is bifurcated at its outer end for the reception of a roller 70 mounted on the arm by means of a pin 71. This roller is adapted to bear against the projecting end of the piston 66 to force it into the cylinder 60 as the link 46 is swung upwardly from the position in which it is shown in broken lines toward the position in which it is shown in full lines in Fig. 4. In this movement, fluid is forced from the cylinder through the conduit 64 or conduit 66 when present, and is directed through the conduit 64 to the secondary piston and cylinder device 56.

A preferred form of the secondary piston and cylinder device 56, as shown in Fig. 2 of the drawing, comprises a cylinder 75 having one end closed by a plate 76 formed with a rearwardly projecting lug or projection 77 apertured to receive a pin 78 for operatively connecting the cylinder to the struts 35 of the implement frame. This cylinder to fitted with a piston 79 having a piston rod 80 extending through a closure head 81 at the other end of the cylinder. The piston rod is provided at its projecting end with an apertured coupling element 82 by which it is operatively connected with the shackle 20 through the medium of a pivot pin 83. The conduit 64 is connected to the cylinder 75 adjacent its closed end, thereby introducing fluid from the primary piston and cylinder devices behind the piston 79 to urge it forwardly. A spring 84, acting between the head 81 and the rod end of the piston 79, urges the piston rearwardly so as to force fluid from the cylinder when pressure is relieved in the primary piston and cylinder device.

In the operation of the implement and tractor combination above described, the implement is lowered to working position by appropriate setting of the quadrant lever on the tractor. The quadrant lever, of course, determines the working depth by establishing the cut-off point for the power unit on the tractor; that is, the point at which the system is in balance. As the implement is drawn forwardly, the soil pressure on the ground working tools tends to rock the assembly about the pivots of the parallel links 46 and 47, and the first-mentioned link, through the arm 52 and roller 70, tends to force the piston 66 into the cylinder 60. Fluid is thus forced from the cylinder through the conduit 64 to the closed end of the secondary cylinder 75 tending to move the piston 79 forwardly and impart a corresponding movement to the control plunger 17 against the resistance of the main control spring 18. The control plunger is advanced sufficiently to balance the system or, in other words, to shut off the power unit when the tools attain the working depth for which the quadrant lever is set.

Any variation of the tools from the predetermined depth will produce a corresponding variation in the pressure on the piston 79 and consequently effect movement of the control plunger in a direction to initiate a corrective raising or lowering of the hitch linkage and the implement frame. Upon such movement in either direction the tool assembly, or each of them if there is a plurality, will assume a position effective to produce the desired soil pressure, or in other words, will penetrate to the desired working depth. The vertical positioning of the individual tools is thus determined by their actual depth in the soil rather than with reference to an artificial datum line.

It will be appreciated that the control force transmitting mechanism may be constructed and arranged to multiply or divide the force available for actuating the control plunger by appropriate proportioning of the arm 52 with respect to the length of the links 46, 47. Where relatively small soil pressures are available, as in the case of implements of the cultivator type, the arm will be proportioned to afford a relatively large leverage ratio such that the pressures generated in the primary piston and cylinder devices of the mechanism will rise to a value suitable for operation of the tractor control plunger. Conversely, for use with implements subject to heavy draft loads, as for example plows, the leverage ratio is reduced to afford precisely the right pressure range in the system. As the force transmitting mechanism is mounted on and forms a part of the implement, it can obviously be designed to provide precisely the right degree of control for that implement. The tractor may, therefore, be equipped with a control spring of standard size and yet operate at the most efficient level with any implement attached thereto.

The improved control force transmitting mechanism lends itself readily to a construction which provides automatic compensation for changes in the relative position of the ground working tools with respect to the implement frame. This is shown diagrammatically in Fig. 6. This compensation is attained by reason of the novel angular relationship between the plunger 66, the link 46, and the arm 52. Referring to Fig. 6 of the drawings, when the ground working tool is in a lower position with respect to the frame as shown in full lines, the lever arm through which the soil pressure force is effectively applied to the pivot, is represented by the vector Y. Under those conditions the effective length of the arm through which the plunger 66 acts is represented by the vector X. As the ground working tool rises toward the position shown in dotted lines, the effective length of the first-mentioned lever arm is substantially reduced as indicated by the vector Y'. The angle between the plunger 66 and the arm 52 also increases and the effective length of the upper lever arm decreases proportionately as indicated by the vector X'. The arrangement is such that the ratio between X and Y remains constant or substantially constant throughout the entire range of movement of the tool assembly relative to the implement frame. Accordingly, the force transmitting effectiveness of the mechanism remains substantially constant and accurate depth control may be maintained throughout the entire range of movement of the tool assembly.

Figure 8:
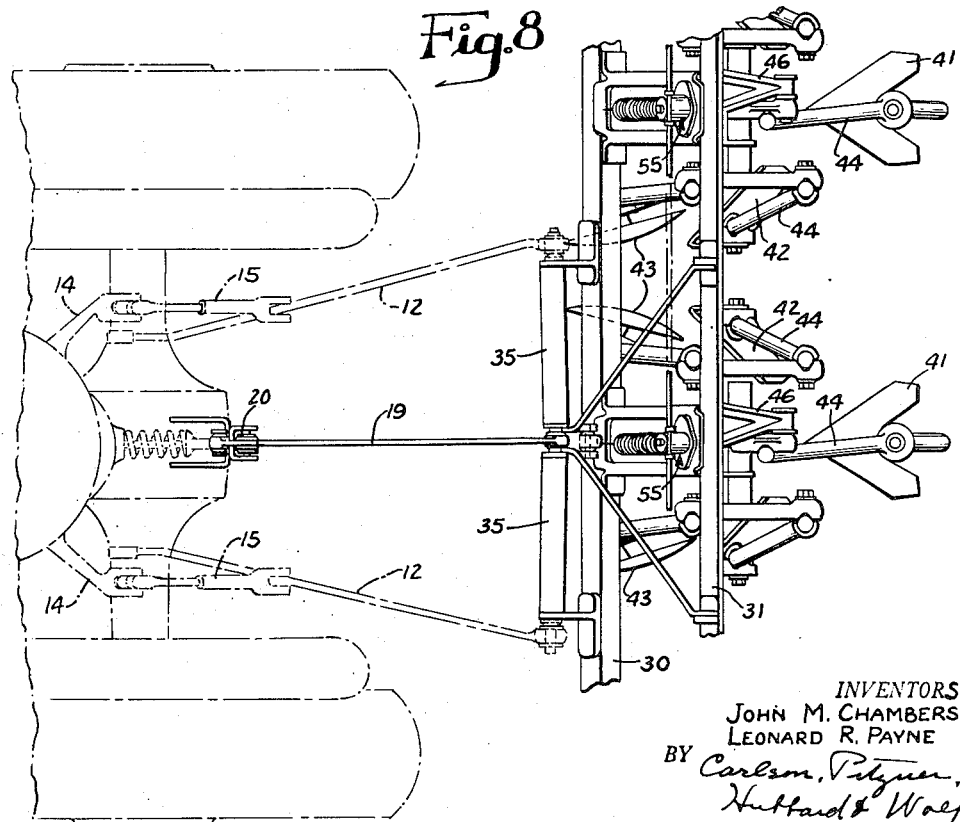
Fig. 8 is a top view of the tractor and implement shown in Fig. 7.

The primary piston and cylinder devices 55 may be utilized for equalizing the forces acting on the individual tool assemblies if desired, without employment of the secondary piston and cylinder device for transmitting control force to the plunger 17. When so used, the secondary piston and cylinder device is disconnected from the tractor and the implement and the end port of the primary cylinder 60 is closed by means of a plug inserted in the fitting 63. The top link 19 is then shifted to its conventional position; that is, its forward end is connected to the shackle 20 by the pin 83 and its rear end is connected to the struts 35 by the pin 78 as shown in Figs. 7 and 8. With this arrangement the primary cylinders perform their equalizing function precisely as explained heretofore. In this instance, however, movement of the implement assemblies relative to the implement frame is limited by the primary cylinder and piston devices, and consequently the soil pressure on the ground working tools will tend to rock the implement bodily in a forward direction. A proportionate force is accordingly transmitted through the top link 19 and shackle 20 to the control plunger 17 to regulate the working depth of the implement.

It will be apparent from the foregoing that the invention provides mechanism of a novel and advantageous character for operating the depth controls of a tractor in response to the ground reaction on an attached implement. By utilizing the movements of the tools of the implement relative to the implement frame, as distinguished from bodily rocking of the implement, for control purposes, accurate depth control may be obtained with implements having widely different soil resistance characteristics without requiring any alteration or adjustment of the tractor controls when implements are interchanged. Thus the mechanism may be constructed to provide precisely the proper range of control for the implement with which it is associated, whether that implement be subject to heavy draft loads as in the case of plows and sub-soilers, light draft loads as in the case of cultivators, seeders, etc., or draft loads intermediate those extremes.

The improved control force transmitting mechanism may also be employed advantageously to maintain the tools of multiple unit implements at uniform working depths irrespective of differences in the surface level in the areas worked by the individual tools. This feature of the invention is particularly advantageous when employed in conjunction with the tractor depth control feature above described, but it may be used independently thereof if desired, in which case the tractor depth control is operated in the conventional manner.

We claim as our invention:

1. In an implement for attachment to a tractor having trailingly pivoted draft links adapted to be raised and lowered by a power operated actuator controlled by a movable control member, the combination of a frame attachable to the tractor hitch links to be raised and lowered therewith, a soil engaging tool assembly, a parallel motion linkage mounting said tool assembly on said frame for generally vertical movement relative thereto under the urging of the soil pressure on the tool of the assembly, and a linkage interposed between said tool assembly mounting and the control member on the tractor for transmitting the movements of the assembly to the control member on the tractor.

2. An implement of the type defined in claim 1 characterized by having the motion transmitting linkage constructed and related to the mounting linkage so that the forces acting on the tool are increased or decreased in their transmission to the control member.

3. An implement of the type defined in claim 1 characterized by having the motion transmitting linkage and the mounting linkage constructed and arranged to automatically compensate for changes in the position of the tool assembly relative to the frame so as to maintain a uniform leverage ratio between the tool assembly and control member in all positions of the assembly.

4. An implement for attachment to a tractor having trailingly pivoted draft links adapted to be raised and lowered by a power unit under control of a movable control member, said implement comprising a frame attachable to the trailing ends of the draft links and adapted to be raised and lowered therewith, an upright rigid structure on said frame, a rigid link pivoted at one end on said upright structure above the frame and adapted to be pivotally connected at its other end to the upper portion of the tractor to restrain the frame against tilting as it is raised or lowered by the draft links, a pressure fluid operated actuator connected to said upright structure and adapted to be connected to the control member on the tractor, a soil engaging tool assembly mounted on said frame for movement relative thereto from a normal position an amount proportioned to a change in the soil pressure on the assembly, and means actuated by the movements of said tool assembly for supplying pressure fluid to or withdrawing it from said actuator.

5. An implement for attachment to a tractor having trailingly pivoted draft links adapted to be raised or lowered by a power unit under control of a movable control member, said implement comprising a frame attachable to the trailing ends of the draft links and adapted to be raised and lowered therewith, an upright rigid structure on said frame, a rigid link pivoted at one end on said upright structure above the frame and adapted to be pivotally connected at its other end to the upper portion of the tractor to restrain the frame against tilting as it is raised or lowered by the draft links, a pressure fluid operated actuator connected to said upright structure and adapted to be connected to the control member on the tractor, a soil engaging tool assembly mounted on said frame for movement relative thereto from a normal position an amount proportioned to a change in the soil pressure on the assembly, a cylinder mounted on the implement frame, conduit means connecting said cylinder with said actuator, said cylinder, said conduit and said actuator being substantially filled with fluid, and a plunger in said cylinder operatively connected with said tool assembly for displacement thereby in proportion to the movements of the assembly.

6. An implement for attachment to a tractor having trailingly pivoted draft links adapted to be raised and lowered by a power unit under control of a movable control member, said implement comprising a frame attachable to the trailing ends of the draft links and adapted to be raised and lowered therewith, an upright rigid structure on said frame, a rigid link pivoted at one end on said upright structure above the frame and adapted to be pivotally connected at its other end to the upper portion of the tractor to restrain the frame against tilting as it is raised or lowered by the draft links, a pressure fluid operated actuator connected to said upright structure and adapted to be connected to the control member on the tractor, a soil engaging tool assembly mounted on said frame for movement relative thereto from a normal position an amount proportioned to changes in the soil pressure on the assembly, a cylinder mounted on the implement frame, conduit means connecting said cylinder with said actuator, said cylinder, said conduit, and said actuator being substantially filled with fluid, a plunger slidable in said cylinder and adapted to project at one end thereof, and a lever pivoted on said frame and adapted to be rocked about its pivot in unison with the movements of said tool assembly, said lever having its free end positioned to engage the projecting end of said plunger and impart corresponding movements thereto.

7. In an implement for attachment to a tractor having trailingly pivoted draft links adapted to be raised and lowered by a power operated actuator controlled by a movable control member, the combination of a frame attachable to the tractor hitch links to be raised and lowered therewith, a soil engaging tool assembly mounted on said frame for movement relative thereto from a normal position an amount proportioned to a change in the soil pressure on the assembly, means interposed between said tool assembly and said frame for pressurizing fluid in proportion to the pressure exerted on the tool assembly as an incident to its passage through the soil, and means interposed between said frame and the control member of the tractor operated by the fluid so pressurized for transmitting a proportionate force to the control member.

8. In an implement for attachment to a tractor having trailingly pivoted draft links adapted to be raised and lowered by a power operated actuator controlled by a movable control member, the combination of a frame attachable to the tractor hitch links to be raised and lowered therewith, a soil engaging tool assembly mounted on said frame for movement relative thereto from a normal position an amount proportioned to a change in the soil pressure on the assembly, a pair of cylinder and piston units connected in a closed hydraulic circuit, the cylinders of each of said units being rigidly supported with respect to the implement frame and one of the units having its piston operatively connected with the control member on the tractor, the other of said units having its piston operatively connected with said tool assembly for displacement thereby in proportion to the soil pressure on the assembly.

9. In an implement for attachment to a tractor having trailingly pivoted hitch links adapted to be raised and lowered by a power unit controlled by a movable control member, the combination of a frame attachable to the tractor hitch links to be raised and lowered therewith, a plurality of soil engaging tool assemblies mounted on said frame for independent movement relative thereto in response to the soil pressure on the tools of the assemblies, pressure fluid operated means for each assembly connected to oppose movement of the assembly by the soil pressure, conduit means connecting the pressure fluid operated means in a closed hydraulic circuit so as to equalize the pressures on said assemblies, and means for transmitting to the control member on the tractor a force proportioned to the ground resistance encountered by the tool assemblies.

10. An implement of the character set forth in claim 9 in which the control force is transmitted to the control member on the tractor by a pressure fluid operated actuator connected to the pressure fluid operated means associated with the tool assemblies.

11. In an implement for attachment to a tractor having a hitch linkage adapted to be raised and lowered by a power unit under control of a shiftable control member, the combination of a frame attachable to the tractor hitch linkage to be raised and lowered therewith, a plurality of soil engaging tool assemblies mounted on said frame for independent up and down movement relative thereto in response to soil pressure on the tools of the assemblies, means interconnecting said tool assemblies operative to equalize the pressure acting thereon by simultaneous adjustment of the same relative to the implement frame to independently regulate their respective working depths, and means interposed between the implement frame and the control member on the tractor for shifting the control member when the total ground resistance encountered by the tools of the assemblies varies from a predetermined value.

12. In an implement for attachment to a tractor having a hitch linkage adapted to be raised and lowered by a power unit under control of a shiftable control member, the combination of a frame attachable to the tractor hitch linkage to be raised and lowered therewith, a plurality of soil engaging tool assemblies mounted on said frame for independent up and down movement relative thereto in response to soil pressure on the tools of the assemblies, means interconnecting said tool assemblies operative to equalize the pressure acting thereon by simultaneous adjustment of the same relative to the frame to independently regulate their respective working depths, said frame being connected to the hitch linkage in a manner such that it tends to rock relative to the linkage when the total ground resistance on the tools of the assemblies varies from a predetermined value, and means including a rigid link connected between the frame and the control member on the tractor for transmitting the rocking movements of the frame to said control member for shifting the control member when the total ground resistance encountered by the tools of the assemblies varies from a predetermined value.

13. In an implement for attachment to a tractor having a hitch linkage adapted to be raised and lowered by a power unit under control of a shiftable control member, the combination of a frame attachable to the tractor hitch linkage to be raised and lowered therewith, a plurality of soil engaging tool assemblies mounted on said frame for independent up and down movement relative thereto in response to soil pressure on the tools of the assemblies, means interconnecting said tool assemblies operative to equalize the pressure acting thereon by simultaneous adjustment of the same relative to the implement frame to independently regulate their respective working depths, means restraining said frame against forward rocking movement relative to the tractor, and means connecting said equalizing means with the control member on the tractor operative to shift the member to cause a bodily raising or lowering of the frame and tool assemblies for maintaining a predetermined total ground resistance encountered by the tools of the assemblies.

14. In an implement for attachment to a tractor having a hitch linkage adapted to be raised and lowered by a power unit under control of a shiftable control member, the combination of a frame attachable to the tractor hitch linkage to be raised and lowered therewith, a plurality of soil engaging tool assemblies mounted on said frame for independent up and down movement relative thereto in response to soil pressure on the tools of the assemblies, a primary cylinder and piston device operatively connected between each tool assembly and the implement frame so as to oppose upward movement of the assembly, conduit means connecting all of said devices in a common closed hydraulic circuit whereby the soil pressure acting on the respective tools is equalized, and means connected between the implement frame and the tractor for shifting the control member on the tractor in accordance with the ground resistance encountered by the tool assemblies.

15. In an implement for attachment to a tractor having a hitch linkage adapted to be raised and lowered by a power unit under control of a shiftable control member, the combination of a frame attachable to the tractor hitch linkage to be raised and lowered therewith, a plurality of soil engaging tool assemblies mounted on said frame for independent up and down movement relative thereto in response to soil pressure on the tools of the assemblies, a primary cylinder and piston device operatively connected between each tool assembly and the implement frame so as to oppose upward movement of the assembly, a secondary cylinder and piston device connected between said frame and the control member on the tractor, and conduit means connecting said primary and said secondary cylinder and piston devices in a common closed hydraulic circuit whereby a force proportioned to the ground resistance encountered by said assemblies is transmitted to the control member.

16. An implement comprising, in combination, an elongated rigid frame disposed horizontally transversely across the line of travel of the implement, a tool bar having means for interchangeable attachment of ground working tools, means mounting said tool bar on said frame for relative up and down movement including a pair of rigid links disposed in spaced parallel relation in trailing relation to the frame, said links being pivotally connected at one end with the frame and at the other end with the tool bar, an extension on one of said links projecting beyond its pivotal axis, spring means connected between the implement frame and said extension for counterbalancing the weight of the tool bar and attached tools, and other means cooperating with said extension opposing upward movement of the tool bar by soil pressure acting on the tools, said other means including a cylinder mounted on the implement frame, and a piston working in said cylinder and projecting therefrom into the path described by said extension in the upward movement of the tool bar.

17. An implement comprising, in combination, an elongated rigid frame disposed horizontally transversely across the line of travel of the implement, a tool bar having means for interchangeable attachment of ground working tools, means mounting said tool bar on said frame for relative up and down movement including a pair of rigid links disposed in spaced parallel relation in trailing relation to the frame, said links being pivotally connected at one end with the frame and at the other end with the tool bar, an extension on one of said links projecting beyond its pivotal axis, pressure fluid operated means resisting the upward movement of the tool bar comprising cylinder and piston elements one of which is secured to the implement frame and the other of which is disposed in the path described by said extension in the movement of said tool bar.

References Cited in the file of this patent

UNITED STATES PATENTS

| | | |
|---|---|---|
| 1,867,521 | Mote | July 12, 1932 |
| 1,900,440 | Ferguson | Mar. 7, 1933 |
| 1,926,619 | Hasselberg | Sept. 12, 1933 |
| 2,133,180 | Tuft | Oct. 11, 1938 |
| 2,318,205 | Drennan | May 4, 1943 |
| 2,379,779 | Ash | July 3, 1945 |
| 2,405,980 | Sands et al. | Aug. 20, 1946 |
| 2,456,693 | Fraga | Dec. 21, 1948 |
| 2,561,614 | Dixon | July 24, 1951 |
| 2,567,107 | Gobeil | Sept. 4, 1951 |
| 2,575,622 | Fraga | Nov. 20, 1951 |
| 2,621,575 | Berg | Dec. 16, 1952 |

FOREIGN PATENTS

| | | |
|---|---|---|
| 473,798 | France | Oct. 15, 1914 |
| 393,750 | Germany | Apr. 16, 1924 |
| 410,734 | Germany | Mar. 5, 1925 |